United States Patent Office 3,804,763
Patented Apr. 16, 1974

3,804,763
DISPERSANT COMPOSITIONS
Norman Anthony Meinhardt, Lyndhurst, Ohio, assignor to The Lubrizol Corporation, Wickliffe, Ohio
No Drawing. Filed July 1, 1971, Ser. No. 150,017
Int. Cl. C10l 1/22; C10m 1/20, 1/32
U.S. Cl. 252—51.5 A      15 Claims

ABSTRACT OF THE DISCLOSURE

This invention is directed to an oil soluble dispersant and to a process for preparing said dispersant which comprises contacting and reacting at least one carboxylic-acylating agent having at least about 30 aliphatic carbon atoms per molecule with effective amounts of at least one hydroxy compound, at least one polyoxyalkylene polyamine having an average molecular weight of at least about 200 and from zero to about 4.0 equivalents of at least one alkylene amine per equivalent of said carboxylic-acylating agent. The dispersant of this invention is particularly useful as an additive for a variety of oleaginous materials including, for example, fuels, lubricating oils, hydraulic fluids and the like.

---

This invention relates to an oil soluble dispersant and more specifically to an oil soluble dispersant having demulsifying characteristics which is particularly useful as an additive for a variety of oleaginous materials including for example, normally liquid fuels, e.g., gasoline, diesel fuels, etc., lubricating oils, hydraulic fluids and the like. More specifically, this invention is directed to an oil soluble dispersant and to a process for preparing said dispersant which comprises contacting and reacting (A) at least one carboxylic-acylating agent having at least about 30 aliphatic carbon atoms per molecule with effective amounts of (B) at least one hydroxy compound, e.g., a polyhydric alcohol, and (C) at least one polyoxyalkylene polyamine having an average molecular weight of at least about 200. As a modification, the oil soluble dispersant of this invention may be prepared by contacting and reacting the carboxylic-acylating agent with an effective amount of (D) at least one alkylene amine in addition to (B) the hydroxy compound, and (C) the polyoxyalkylene polyamine.

The oil soluble dispersant of this invention may be used either alone or in combination with other well known additives including, for example, detergents, extreme pressure agents, dispersants, oxidation inhibitors, viscosity-index improving agents, rust inhibitors, etc., in small but effective amounts in various oleaginous materials.

Presently, various oil soluble dispersants are being used as additives in fuels or lubricants for power-transmitting units, gears, internal combustion engines, etc. While these dispersants have achieved widespread acceptance there is a need, however, for additives which have improved demulsifying characteristics. It is generally known that while many of the dispersants are effective, as additives, in lubricating oils, fuels, etc., their presence may tend to promote emulsification in the presence of water. This is particularly true, where water vapor enters the crankcase of an internal combustion engine, for example, and provides the environment for the formation of an emulsion which adversely affects the function of the lubricant.

To avoid these and other similar problems and to eliminate or substantially minimize the formation of an emulsion due to water accumulation, it has been found in accordance with this invention that an oil soluble dispersant having improved demulsifying characteristics can be obtained by contacting and reacting (A) at least one carboxylic-acylating agent, i.e., a carboxylic acid or acid-producing compound, having at least 30 aliphatic carbon atoms per molecule with( B) at least about 0.001 equivalent of at least one hydroxy compound, e.g., an alcohol having from 2 to 10 hydroxyl groups per molecule (C) at least about 0.001 equivalent of at least one high molecular weight polyoxyalkylene polyamine and (D) from zero to about 4.0 equivalents of at least one alkylene amine per equivalent of said acylating agent. Preferably, however, the oil soluble dispersant of this invention may be obtained by contacting and reacting the hydroxy compound, the polyoxyalkylene polyamine and the alkylene amine with at least one substantially saturated, hydrocarbon-substituted carboxylic-acylating agent wherein said hydrocarbon substituent has at least about 30 aliphatic carbon atoms and preferably at least about 50 aliphatic carbon atoms, e.g., the substantially saturated, hydrocarbon-substituent has an average molecular weight of at least about 400.

Accordingly, it is an object of this invention to provide a dispersant having improved demulsifying characteristics which may be used either alone or in combination with other known additives in various oleaginous materials including, for example, lubricating oils, fuels, etc. It is another object of this invention ot provide a high molecular weight oil soluble dispersant and a process for preparing same wherein said dispersant is particularly characterized by its demulsifying characteristics in the presence of water and other additives.

These and other objects of the invention are accomplished by providing a high molecular weight oil soluble dispersant having demulsifying characteristics which is obtained by contacting and reacting (A) at least one carboxylic-acylating agent, i.e., carboxylic acid or acid-producing compound, having at least about 30 aliphatic carbon atoms per molecule with (B) at least about 0.001 equivalent of at least one hydroxy compound per equivalent of said acylating agent (C) at least about 0.001 equivalent of at least one high molecular weight polyoxyalkylene polyamine per equivalent of said acylating agent and (D) from zero to about 4.0 equivalents of at least one alkylene amine per equivalent of said acylating agent. Preferably, however, this invention relates to an oil soluble dispersant and to the process for preparing same which comprises reacting (A) at least one substantially saturated, hydrocarbon-substituted carboxylic-acylating agent, i.e., carboxylic acid or acid-producing compound, such as the anhydrides, esters, halides, etc., wherein said hydrocarbon substituent has at least about 30 and preferably at least 50 aliphatic carbon atoms with effective amounts of (B) at least one hydroxy compound, e.g., an alcohol having 2 to 10 hydroxyl groups per molecule, (C) at least one polyoxyalkylene polyamine having an average molecular weight of at least about 200 and (D) from zero to about 4.0 equivalents of an alkylene amine per equivalent of said carboxylic-acylating agent.

In preparing the oil soluble dispersant, at least one acylating agent, i.e., a carboxylic acid or acid-producing compound is utilized which may be characterized as a monocarboxylic or polycarboxylic acid or acid-producing compound, e.g., mono, di- and tricarboxylic acids and the derivatives thereof. In a preferred embodiment, the oil soluble dispersant may be prepared by utilizing a substantially saturated, hydroncarbon-substituted carboxylic acid or acid-producing acylating agent, e.g., acrylic or maleic acids an the derivatives theretof, wherein the hydrocarbon substituent has at least about 30 and preferably 50 carbon atoms per carboxylic acid or acid-producing group, e.g., a hydrocarbon substituent having an average molecular weight of at least about 400.

The requirement that the acylating agent have at least about 30 aliphatic carbon atoms is based not only upon the consideration of oil solubility but also upon the effectiveness of the dispersant as an additive for the purpose indicated, e.g., a dispersant having improved demulsifying characteristics. Moreover, it is preferred also that the hydrocarbon substituent of the acylating agent be substantially saturated, e.g., at least about 95% of the total number of carbon-to-carbon covalent linkages are substantially saturated linkages. Further, the hydrocarbon substituent of the dispersant, preferably, should be substantially free from oil solubilizing pendent groups, i.e., groups having more than about 6 aliphatic carbon atoms. While some oil solubilizing pendent groups may be present they should be present in amounts less than about one of said groups for about every 25 aliphatic carbon atoms in the main hydrocarbon chain. In addition, the hydrocarbon substituent may contain a polar substitutent provided that the polar substituent is not present in an amount sufficiently large to alter, significantly, the hydrocarbon character of the radical. Thus, the polar substituent may be present in an amount ranging up to about 20% by weight of the hydrocarbon substituent and preferably in an amount ranging up to about 10% by weight of the hydrocarbon substituent. These polar substituents may include, for example, chloro, keto, bromo, ethereal, nitro, aldehydo, etc.

In the preferred embodiment, the hydrocarbon substituent may comprise either a high molecular weight substantially-saturated petroleum fraction or a substantially-saturated olefin polymer, e.g., a polymer of a monoolefin having from about 2 to 30 carbon atoms. For example, polymers which are particularly useful for this purpose include the polymers of 1-mono-olefins, e.g., ethylene, propene, 1-butene, isobutene, 1-hexene, 1-octene, 2-methyl-1-heptene, 3-cyclohexyl-1-butene, and 2-methyl-5-propyl-1-hexene. In addition, a polymer of an olefin wherein the olefinic linkage is not in the terminal position is likewise useful and may include, for example, 2-butene, 3-pentene, 4-octene, etc.

In the preferred embodiment, interpolymers of the olefins are useful also and include those illustrated above with other interpolymerizable olefinic materials, e.g. aromatic olefins, cyclic olefins, polyolefins, etc. These interpolymers, for example, may be prepared by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with 1-pentene; 3-methyl-1-butene with 1-octene; 3,3-dimethyl-1-pentene with 1-hexene; isobutene with styrene and piperylene; etc.

The relative proportions of the mono-olefins to the other monomers in the interpolymers, influence the stability and the oil solubility of the dispersant derived from these interpolymers. Thus, for reasons of oil solubility and stability the interpolymers contemplated in the preferred embodiment should be substantially aliphatic and substantially saturated. For example, the interpolymers should contain at least about 80% and preferably about 95% by weight of units derived from the aliphatic mono-olefins and no more than about 5% by weight of olefinic linkages based on the total number of carbon-to-carbon covalent linkages. In a more preferred embodiment, the percent of the olefinic linkages should be less than about 2% by weight of the total number of carbon-to-carbon covalent linkages. Specific examples of these interpolymers include a copolymer of 95% by weight of isobutene with 5% of styrene; a terpolymer of 98% by weight of isobutene with 1% of piperylene and 1% of chloroprene; a terpolymer of 95% by weight of isobutene with 2% of 1-butene and 3% of 1-hexene; a terpolymer of 60% by weight of isobutene with 20% by weight of 1-pentene and 20% by weight of 1-octene; a copolymer of 80% by weight of 1-hexene and 20% by weight of 1-heptene; a terpolymer of 90% by weight of isobutene with 2% by weight of cyclohexene and 8% by weight of propene; and a copolymer of 80% by weight of ethylene and 20% by weight of propene. Another source of hydrocarbon radicals include the saturated aliphatic hydrocarbons, e.g., highly refined high molecular weight white oils or the synthetic alkanes including those obtained by hydrogenating the high molecular weight olefin polymers illustrated hereinabove.

In the preferred embodiment, olefin polymers having average molecular weights ranging from about 400 to 10,000 and more preferably ranging from about 700 to 5000 may be used. Moreover, the higher molecular weight olefin polymers, e.g., polymers having average molecular weights from about 10,000 to 100,000 or higher may be used. It has been found, that the higher molecular weight polymers impart viscosity-index improving properties to the dispersant. In many instances, however, the use of the higher molecular weight olefin polymers may be desirable.

Of the various carboxylic-acylating agents, i.e., carboxylic acids or acid-producing compounds which may be used for purposes of this invention, the substantially saturated, aliphatic hydrocarbon-substituted mono and dicarboxylic acids and the derivatives thereof, e.g., acrylic or succinic acid including the anhydrides, esters and other derivatives thereof, are particularly preferred. For example, a high molecular weight succinic acid may be prepared, for purposes of this invention, by reacting maleic acid with a high molecular weight olefin, e.g., a chlorinated olefin polymer, at temperatures ranging from about 80° C. to about 250° C. until the desired product is obtained. If necessary, any ethylenic unsaturation in the hydrocarbon substituent may be hydrogenated to saturated linkages. It is obvious that either the anhydride or the acid may be converted, if desired, to the corresponding ester or halide by reacting the acid with various compounds including, for example, phosphorus halides, alcohols, phenols, etc. Another example for preparing a high molecular weight succinic acid or the anhydride thereof, comprises the reaction of itaconic acid with either a high molecular weight olefin or a polar-substituted hydrocarbon at temperatures ranging from about 80° C. to about 250° C.

The mono-carboxylic acid acylating agents having at least 30 and preferably at least 50 aliphatic carbon atoms may be obtained, for example, by oxidizing a monohydric alcohol with potassium permanganate, etc. or by reacting a halogenated high molecular weight olefin polymer with a ketene. Another method for preparing the mono-carboxylic acid acylating agents comprises reacting metallic sodium with an acetoacetic ester or a malonic ester of an alkanol to form the sodium derivative of the ester and subsequently reacting the sodium derivative with a halogenated high molecular weight hydrocarbon, e.g., brominated wax, brominated polyisobutene, etc.

In addition to the mono and dicarboxylic acids or acid-producing acylating agents, other polycarboxylic-acylating agents and the derivatives thereof having more than two carboxylic groups may be used for purposes of this invention. These polycarboxylic-acylating agents may be characterized also as containing at least about 30 aliphatic carbon atoms and preferably at least 50 aliphatic carbon atoms for each carboxylic acid or acid-producing group. Some of these polycarboxylic-acylating agents may be obtained, for example, by halogenating a high molecular weight hydrocarbon, e.g., an olefin as described hereinabove to obtain a poly-halogenated product which may be converted to a polynitrile and then subsequently hydrolyzed to the acid. In addition, the polycarboxylic acids may prepared, for example, by the oxidation of a high molecular weight polyhydric alcohol with potassium permanganate, nitric acid or some other similar oxidizing agent. Still further, another example for preparing a polycarboxylic-acylating agent comprises the reaction of an olefin or a polar-substituted hydrocarbon, e.g., chlorinated polyisobutene, with an unsaturated polycarboxylic acid, e.g., 2-pentene-1,3,5-tricarboxylic acid which may be obtained from the dehydration of citric acid.

Still further, other polycarboxylic-acylating agents which may be used for purposes of this invention include the tricarboxylic acids and the derivatives thereof, e.g., the esters, etc. These polycarboxylic acids and the esters thereof may be converted to high molecular weight acylating agents by reacting the acids or the esters, with a high molecular weight hydrocarbon, including for example, the olefin polymers or the polar-substituted hydrocarbons, e.g., a halogenated polyisobutene, etc.

A particular class of tricarboxylic-acid esters which may be used, for purposes of this invention, to obtain the high molecular weight acylating agents may be prepared by reacting an acrylic compound, e.g., methyl acrylate with a maleic-acid ester or a fumaric-acid ester in the presence of a catalytic amount of an organic tertiary phosphorus compound selected from the group consisting of tertiary phosphines and tertiary phosphoramides. More specifically, the tricarboxylic-acid esters may be prepared by reacting a maleic-acid ester or a fumaric-acid ester in an amount ranging from about 0.1 to 5.0 moles and preferably from 3.0 to 1.5 moles for each mole of the acrylic compound in the presence of a catalyst. The catalyst may be present in a catalytic amount, e.g., amounts ranging from about 0.0001 to 0.1 moles of the organic tertiary phosphorus compound per mole of said acrylic compound. Specific examples of the tricarboxylic-acid esters which may be converted to high molecular weight carboxylic-acylating agents, for purposes of this invention, include 1,2,3-triethoxycarbonyl butene-3;
1,2,3-triethoxycarbonyl butene-3;
1,2,3-tri-n-butoxycarbonyl butene-3;
1,2-dimethoxycarbonyl-3-ethoxycarbonyl butene-3;
1,2-diethoxycarbonyl-3-methoxycarbonyl butene-3;
1,2-dicyclohexyloxycarbonyl-3-methoxy carbonyl butene-3;
1,3-dimethoxycarbonyl-2-ethoxycarbonyl butene-3;
1,2-diethoxycarbonyl-3-methoxycarbonyl butene-3;
1,2,3-triallyloxycarbonyl butene-3;
1,2-diallyloxycarbonyl-3-methoxybonyl butene-3;
1,2-diallyloxycarbonyl-3-ethoxycarbonyl butene-3;
1,2-di-n-butoxycarbonyl-3-methoxycarbonyl butene-3;
1,2-di-n-butoxycarbonyl-3-ethoxycarbonyl butene-3;
1,2-di-ethoxycarbonyl-3-n-propoxycarbonyl butene-3;
1,2-di-octyloxycarbonyl-3-methoxycarbonyl butene-3;
1,2-di-ethoxycarbonyl-3-(2-hydroxyethoxy)carbonyl butene-3;
1,2-di-methoxycarbonyl-3-phenoxycarbonyl butene-3;
1,2-diphenoxycarbonyl-3-methoxycarbonyl butene-3;
1,2-dimethoxycarbonyl-3-stearyloxycarbonyl butene-3, etc.

The methods for converting the acids or acid-producing acylating agents, e.g., acrylic acid, maleic acid or a tricarboxylic acid and the derivatives thereof, to high molecular weight carboxylic-acylating agents are well known as illustrated, for example, by U.S. Pats. 3,219,666 and 3,454,607; the disclosures of which are hereby incorporated by reference.

The hydroxy compounds which may be used to react with the carboxylic-acylating agents include the hydroxy aliphatic compounds such as, for example, the monohydric and polyhydric alcohols or the aromatic compounds such as the phenols, naphthols, etc. Specific aromatic hydroxy compounds include, for example, phenol, beta-naphthol, alpha-naphthol, cresol, resorcinol, catechol, p,p' - dihydroxybiphenyl, 2 - chlorophenol, 2,4 - dibutylphenol, propene tetramer-substituted phenol, didodecylphenol, 4,4' - methylene -bis-phenol, alpha - decyl-beta-naphthol, polyisobutene (molecular weight of 1000)-substituted phenol, the condensation product of heptyphenol with 0.5 mole of formaldehyde, the condensation product of octylphenol with acetone, di(hydroxyphenyl)oxide, di(hydroxyphenyl)sulfide, di-(hydroxyphenyl)disulfide, 4-cyclohexyl phenol, etc. Of the phenols, the alkylated phenols having up to about three alkyl substituents containing 100 or more carbon atoms are particularly preferred.

Other hydroxy compounds preferred contain up to about 40 aliphatic carbon atoms and may include, for example, the monohydric alcohols such as methanol, ethanol, isooctanal, dodecanol, cyclohexanol, cyclopentanol, behenyl alcohol, hexatriacontanol, neopentyl alcohol, isobutyl alcohol, benzyl alcohol, beta-phenylethyl alcohol, 2-methyl-cyclohexanol, beta - chloro - ethanol, monomethyl ether of ethylene glycol, monobutyl ether of ethylene glycol, monopropyl ether of diethylene glycol, monododecyl ether of triethylene glycol, mono-oleate of ethylene glycol, mono-stearate of diethylene glycol, sec-pentyl alcohol, tert-butyl alcohol, 5-bromo-dodecanol, nitro-octadecanol, dioleate of glycerol, etc.

The hydroxy compounds may contain from 2 to 10 hydroxy radicals and preferably from 2 to 6 hydroxyl radicals per molecule. A particularly preferred class of hydroxy compounds include, for example, polyols having 3–6 hydroxyl groups and up to 10 carbon atoms per molecule. The hydroxyl compounds may include, for example, ethylene glycol, diethylene glycol, triethylene glycol, tetraethylene glycol, dipropylene glycol, tripropylen glycol, dibutylene glycol, tributylene glycol, and other alkylene glycols wherein the alkylene radical contains from 2 to 8 carbon atoms. Other useful hydroxyl compounds include glycerol, mono-oleate of glycerol, monostearate of glycerol, monomethyl ether of glycerol, pentaerythritol, 9-10-dihydroxy stearic acid, methyl ester of 9,10-dihydroxy stearic acid, 1,2-butanediol, 2,3-hexanediol, 2,4-hexanediol, penacol, erythritol, arabitol, sorbitol, mannitol, 1,2-cylcohexanediol, xylene glycol, etc. In addition the carbohydrates such as sugars, starches, celluloses, etc., may be used for purposes of this invention. The carbohydrates may be specifically exemplified by glucose, fructose, sucrose rhamnose, mannose, glyceraldehyde, and galactose.

Another class of hydroxy compounds, e.g., alcohols, may include those having at least three hydroxy radicals some of which have been esterified with a monocarboxylic acid having from about 8 to 30 carbon atoms such as, for example, octanoic acid, oleic acid, stearic acid, linoleic acid, dodecanoic acid, tall oil acids, etc. Specific examples of the partially esterified polyhydric alcohols include, for example, the mono-oleate of sorbitol, distearate of sorbitol, mono-oleate of glycerol, monostearate of glycerol, didodecanoic of erythritol, etc.

In addition, other hydroxy compounds which may be reacted with the acylating agent include the unsaturated alcohols such as allyl alcohol, cinnamyl alcohol, propargyl alcohol, 1-cyclohexen-3-alcohol, and oleyl alcohol, etc. Other alcohols which may be reacted with the acylating agent, include the ether alcohols, and amino alcohols, such as, for example, the oxyalkylene-, oxy-arylene-, amino-alkylene- and amino-arylene-substituted alcohols having one or more oxy-alkylene, amino-alkylene, amino-arylene, or oxy-arylene radicals. Specific examples of these alcohols include Cellosolve, Carbitol, phenoxyethanol, heptylphenyl - (oxypropyl)$_6$-H, octyl(oxyethylene)$_{30}$-H, phenyl - (oxyoctylene)$_2$-H, mono(heptylphenyl - oxypropylene)-substituted glycerol, poly(styrene oxide), aminoethanol, 3-amino-ethylpentanol, di(hydroxyethyl)amine, p-aminophenol, tri(hydroxypropyl)amine, N-hydroxyethyl ethylene diamine, N,N,N',N'-tetrahydroxytrimethylene diamine and the like. Of the above-mentioned ether alcohols, the preferred ether alcohols have up to about 150 oxy-alkylene radicals wherein the alkylene radical contains from 1 to 8 carbon atoms.

For purposes of this invention, the hydroxy compounds and various mixtures thereof may be reacted with the carboxylic-acylating agent in amounts of at least about 0.001 equivalent of the hydroxy compound, for each equivalent of the carboxylic-acylating agent. Generally, however, the hydroxy compound is reacted with the carboxylic-acylating agent in an amount ranging from about 0.001 to 1.0 mole of the hydroxy compound for each equivalent of the acylating agent and preferably in an amount ranging from 0.001 to 4.0 equivalents of the hydroxy compound for each equivalent of the acylating agent. Still further, other preferred ratios range from about 0.01 to 3.0 and 0.1 to 2.0 equivalents of the hydroxy compound, for each equivalent of the carboxylic-acylating agent. For purposes of this invention, the number of equivalents of the hydroxy compound to be reacted with the carboxylic-acylating agent is determined by the number of hydroxyl groups present. For example, a polyhydric alcohol, i.e., ethylene glycol with two hydroxy groups per molecule has two chemical equivalents per molecule; whereas a polyhydric alcohol, i.e., pentaerythritol has four chemical equivalents per molecule. Thus the number of chemical equivalents of the hydroxy compound will be determined by the number of hydroxy groups per molecule available to react with the carboxylic-acylating agent. Similarly, an acylating agent with one carboxyl group, i.e., acrylic acid or its derivative, is calculated for purposes of this invention, as having one chemical equivalent; whereas a dicarboxylic acid is calculated as having two chemical equivalents per molecule. Thus, for example, the amount of hydroxy compound to be reacted with the carboxylic-acylating agent, within the above-mentioned ratios, will be determined by the number of carboxylic acid or acid-producing groups in the acylating agent.

In preparing the dispersants of this invention the carboxylic-acylating agent, i.e., acid or acid-producing compound may be reacted with the hydroxy compound, e.g., polyhydric alcohols, etc., at temperatures ranging from about 100° C. up to about 300° C. and preferably at temperatures ranging from about 150° C. to 250° C. If desirable, the reaction of the hydroxy compound and the acylating agent may take place in the presence of a catalyst. The catalyst may include, for example, sulfuric acid, pyridene, hydrochloride, hydrochloric acid, benzene, sulfonic acid, p-toluene sulfonic acid, phosphoric acid, and any of the other well-known catalysts used in esterification reactions. These catalysts, if present, may be used in an amount ranging from about 0.01% to about 5.0% by weight based on the total weight of the reactants. While methods for reacting hydroxy compounds, e.g., an aliphatic alcohol, with carboxylic-acid acylating agents are well-known, a more specific discussion of the reaction may be found, for example, in U.S. Pat. 3,381,022; the disclosure of which is incorporated herein by reference.

The polyoxyalkylene polyamine which may be used for purposes of this invention, e.g., polyoxyalkylene diamines, and polyoxyalkylene triamines, may have average molecular weights ranging from about 200 to 4000 and preferably from about 400 to 2000. Illustrative examples of these polyoxyalkylene polyamines may be characterized by the formulae:

FORMULA I

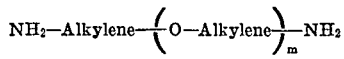

where $m$ has a value of about 3 to 70 and preferably about 10 to 35.

FORMULA II

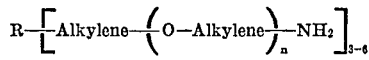

where $n$ is such that the total value is from about 1 to 40 with the proviso that the sum of all of the $n$'s is from about 3 to about 0 and generally from about 6 to about 35 and R is a polyvalent saturated hydrocarbon radical of up to ten carbon atoms having a valence of 3 to 6. The alkylene groups may be straight or branched chains and contain from 1 to 7 carbon atoms, and usually from 1 to 4 carbon atoms. The various alkylene groups present within Formulae I and II may be the same or different and may include for example:

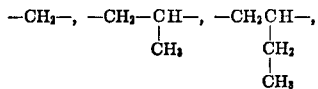

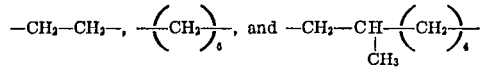

More specific examples of the polyamines include:

FORMULA III

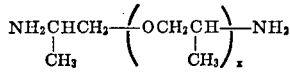

wherein $x$ has a value of from about 3 to 70 and preferably from about 10 to 35 and

FORMULA IV

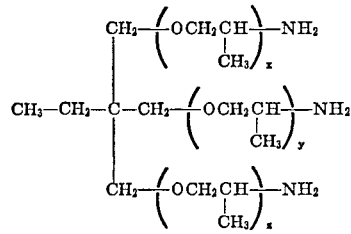

wherein $x+y+z$ have a total value ranging from about 3 to 30 and preferably from about 5 to 10.

The preferred polyoxyalkylene polyamines for purposes of this invention include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D–230, D–400, D–1000, D–2000, T–403," etc.

For purposes of this invention the polyoxyalkylene polyamines and various mixtures thereof, may be reacted with the carboxylic-acylating agent in amounts of at least about 0.001 equivalent of the polyoxyalkylene polyamine for each equivalent of said carboxylic-acylating agent. Preferably, the polyoxyalkylene polyamines may be present in an amount ranging from about 0.001 to 4.0 equivalents of the polyoxyalkylene polyamine for each equivalent of said carboxylic-acylating agents and more preferably in amounts ranging from about 0.01 to 2.0 and 0.01 to 1.0 equivalents of the polyoxyalkylene polyamine for each equivalent of said carboxylic-acylating agent.

The alkylene amines and various mixtures thereof which may be used in preparing the dispersant may be characterized by the formula.

wherein $n$ is an integer ranging up to about 10, R is a substantially hydrocarbon or hydrogen radical, and the alkylene radical is preferably a lower alkylene radical having less than about 8 carbon atoms. The alkylene amines include, for example, methylene amines, ethylene amines, butylene amines, propylene amines, pentylene amines, hexylene amines, heptylene amines, octylene amines, other polymethylene amines, and the cyclic and higher homologs of these amines such as the piperazines, and the aminoalkyl-substituted piperazines. These amines, include, for example, ethylene diamine, triethylene tetramine, propylene diamine, decamethylene diamine, octamethylene diamine, di(heptamethylene) triamine, tripropylene tetramine, tetraethylene pentamine, trimethylene diamine, pentaethylene hexamine, di(trimethylene) triamine, 2-heptyl-3-(2-aminopropyl) imidazoline, 4-methyl-imidazoline, 1,3-bis-(2-aminoethyl) imidazoline, pyrimidine, 1-(2-aminopropyl) piperazine, 1,4 - bis - (2-aminoethyl) piperazine, N,N-dimethylaminopropyl amine, N,N-dioctylethyl amine, N-octyl-N'-methylethylene diamine, and 2 - methyl - 1 - (2 - aminobutyl) piperazine. Other higher homologs which may be used can be obtained by condensing two or more of the above-mentioned alkylene amines in a known manner.

The ethylene amines which are particularly useful are described, for example, in the Encyclopedia of Chemical Technology under the heading of "Ethylene Amines" (Kirk and Othmer), volume 5, pages 898–905; Interscience Publishers, New York (1950). These compounds are prepared by the reaction of an alkylene chloride with ammonia. This results in the production of a complex mixture of alkylene amines, including cyclic condensation products such as piperazines. While mixtures of these amines may be used for purposes of this invention, it is obvious that pure alkylene amines may be used with complete satisfaction. A particularly useful alkylene amine comprises a mixture of ethylene amines prepared by the reaction of ethylene chloride and ammonia which may be characterized as having a composition that corresponds to that of tetraethylene pentamine. In addition, the alkylene amines having one or more hydroxyalkyl substituents on the nitrogen atoms may be used. These hydroxy-alkyl-substituted alkylene amines are preferably compounds wherein the alkyl group is a lower alkyl group, i.e., having less than about 6 carbon atoms and include, for example, N - (2 - hydroxyethyl) ethylene diamine, N,N'-bis(2-hydroxyethyl) ethylene diamine, 1-(2-hydroxyethyl)piperazine, mono - hydroxypropyl - substituted diethylene triamine, 1,4-bis(2-hydroxypropyl)-piperazine, di-hydroxypropyl-substituted tetraethylene pentamine, N-(3-hydroxypropyl)tetramethylene diamine, 2 - heptadecayl-1-(2-hydroxyethyl) imidazole, etc.

For purposes of this invention, the alkylene amines and various mixtures thereof may be reacted with the carboxylic acid or acid-producing acylating agent in an amount ranging from zero to about 4.0 equivalents and, if desired, in an amount of at least about 0.001 equivalent of said alkylene amine for each equivalent of said carboxylic-acylating agents. Generally, however, if it is desirable to utilize the alkylene amines, they may be present in an amount ranging from about 0.001 to 4.0 and preferably in an amount ranging from about 0.01 to 2.0 and more preferably in an amount from about 0.1 to 1.0 equivalent of said alkylene amine for each equivalent of said carboxylic-acylating agent.

In preparing the oil soluble dispersants, the carboxylic-acylating agent is in contact and reacted with effective amounts of at least one high molecular weight polyoxyalkylene polyamine and, if desired, one or more of the alkylene amines and various combinations of these amines. The amines may be characterized as having radicals with the configuration

which are capable of reacting with at least one high molecular weight carboxylic-acylating agent having at least one carboxylic acid or acid-producing group. The carboxylic acid or acid-producing acylating agents may be further characterized, for example, as having at least one acid or acid-producing group characterized by the formula

wherein X is selected from the group consisting of halogen, hydroxy, hydrocarbon-oxy, and acyloxy radicals.

The reaction between the amines, i.e., polyoxyalkylene polyamines and alkylene amines and the carboxylicacylating agent results in the direct attachment of the ntirogen atoms to a polar radical derived from the acid or acid-producing group. The linkage formed between the nitrogen atom and the polar radical may be characterized as an amide, imide, amidine, salt or mixtures of these radicals. The precise relative proportions of these radicals in a particular product, generally, is not known since it depends to a large extent upon the acylating agent and the conditions under which the reaction is carried out. For example, a reaction involving an acid or anhydride with the amines at temperatures below about 50° C., will result predominantly in a salt linkage. However, at relatively higher temperatures, e.g., above 80° C. and up to about 250° C., the results are predominantly an imide, amide, amidine linkage or mixtures thereof. In any event, the products obtained by the process, irrespective of the relative proportions of the various linkages present have been found to be effective for purposes of this invention.

For purposes of this invention, the equivalent weight of the amines, i.e., polyoxyalkylene polyamines and alkylene amines will be determined by the number of nitrogen-containing radicals, i.e., amine groups as defined by the structural configuration

For example, the equivalent weight of a polyoxyalkylene diamine having two amino groups is the molecular weight of said diamine divided by 2. Similarly, the equivalent weight of the carboxylic acid or acid-producing acylating agent is determined by the number of acid or acid-producing radicals defined by the structural configuration

wherein X may be either a halogen, hydroxy, hydrocarbon-oxy or acyloxy radical. For example, the equivalent weight of an acylating agent having two carboxylic acids or acid-producing groups is the molecular weight of said acylating agent divided by 2. Thus, in contacting and reacting (A) the carboxylic-acylating agent with the (B) polyhydroxy compounds, the (C) polyoxyalkylene polyamines and, if desired, the (D) alkylene amines, the reactants are present in amounts, within the above-mentioned ratios, depending upon the equivalent weights which is determined by the number of acid or acid-producing, hydroxy and amino groups per molecule, as indicated hereinabove.

Generally, in preparing the dispersants, the process comprises contacting and reacting at least one carboxylic-acylating agent with at least one hydroxy compound, at least one polyoxyalkylene polyamine and, if desired, one or more alkylene amines in effective amounts at temperatures ranging from about room temperature, e.g., about 25° C. up to about the decomposition temperature of the reactants and the products being prepared. Preferably, however, the reaction temperature may range from about 50° C. up to about 300° C. and preferably from about 100° C. to about 250° C.

It is obvious, that for purposes of this invention, any one of the reactants, i.e., the hydroxy compounds, polyoxyalkylene polyamines, and alkylene polyamines, may be reacted with the carboxylic-acylating agent either alone or in combination with any one of the other reactants. Moreover, each of the reactants, e.g., the hydroxy compound, may be reacted with the carboxylic-acylating agent separately and then subsequently mixed, in the proportions indicated, to obtain a dispersant having improved demulsifying characteristics. If desirable, the reaction may be carried out in various liquids which must be substantially inert with respect to any of the reactants. These solvents or diluents may include, for example, benzene, toluene, naphthylene, xylene, mineral oil, hexane, and various combinations of these and other known inert liquids.

The following examples illustrate the dispersant compositions of this invention.

EXAMPLE 1

A polyisobutenyl succinic anhydride is prepared by reacting a chlorinated polyisobutylene with maleic anhydride at a temperature of about 200° C. The polyisobutenyl radical has an average molecular weight of about 850 and the resulting hydrocarbon substituted anhydride has a saponification number of approximately 106 which corresponds to an average equivalent weight of about 527. Approximately 1500 parts by weight (2.85 equivalents) of the polyisobutenyl succinic anhydride is added to a 5-liter flask fitted with a stirrer, a thermowell, nitrogen inlet tube, and a Dean-Stark trap at about room temperature. Approximately 194 parts by weight (5.7 equivalents) of pentaerythritol is mixed with the polyisobutenyl succinic anhydride at about room temperature. This mixture is heated to a temperature of about 200° C. over a period of about one hour and held at 200°–207° C. for about 3 hours while blowing with nitrogen. Approximately 52 parts by weight (0.05 equivalent) of polyoxypropylene diamine having an average molecular weight of about 2000 and approximately 29 parts by weight (0.69 equivalent) of a polyamine composition comprising polyethylene diamine and Polyamine-H (50/50 percent by weight mixture) are combined at room temperature. The Polyamine-H is a commercial product comprising an ethylene amine mixture having an average composition corresponding to that of tetraethylene pentamine. The polyamine mixture is added to the mixture of polyisobutenyl succinic anhydride and pentaerythritol at a temperature of about 207° C. over a period of about ½ hour while blowing with nitrogen. The reaction mixture is held at temperatures ranging from about 205°–207° C., while blowing with nitrogen. Approximately 1,429 parts by weight of mineral oil is added to the reaction mixture at temperatures ranging from about 131°–205° C. over a period of about ½ hour. Approximately 5% by weight of a conventional filter aid is added to the reaction product and the product is filtered at temperatures ranging from about 115°–130° C. The product is analyzed and found to have a nitrogen content of about 0.32%.

EXAMPLE 2

A polyisobutenyl succinic anhydride is prepared by reacting a chlorinated polyisobutylene with maleic anhydride at a temperature of about 200° C. The polyisobutenyl radical has an average molecular weight of about 850 and the resulting alkenyl succinic anhydride is found to have a saponification number of approximately 106 which corresopnds to an average equivalent weight of about 527. Approximately 1500 parts by weight (2.85 equivalents) of the polyisobutenyl succinic anhydride is added to a 5-liter flask fitted with a stirrer, a thermowell, nitrogen inlet tube and a Dean-Stark trap at about room temperature. Approximately 194 parts by weight (5.7 equivalents) of pentaerythritol is mixed with the polyisobutenyl succinic anhydride at about room temperature. This mixture is heated to a temperature of 202° C. over a period of about 0.8 hour and held at about 202°–208° C. for about 3 hours while blowing with nitrogen. Approximately 52 parts by weight (0.1 equivalent) of a polyoxypropylene diamine having an average molecular weight of about 1000 and approximately 26 parts by weight (0.64 equivalent) of a polyamine composition comprising polyethylene polyamine and Polyamine-H (50/50 percent by weight mixture) are combined at room temperature. The amine mixture is added to the reaction mixture of polyisobutenyl succinic anhydride and pentaerythritol at a temperature of about 270° C. over a period of about ½ hour while blowing with nitrogen. The reaction mixture is held at temperatures ranging from about 207°–209° C. for a period of about 1 hour while blowing with nitrogen. Approximately 1,427 parts by weight of mineral oil is added to the reaction product at temperatures ranging from about 132°–209° C. over a period of about 0.8 hour. Approximately 5% by weight of a conventional filter aid is added to the reaction product and the product is filtered at temperatures ranging from about 120°–130° C. The product is analyzed and found to have a nitrogen content of about 0.31%.

EXAMPLE 3

A polyisobutenyl succinic anhydride is prepared by reacting a chlorinated polyisobutylene with maleic anhydride at a temperature of about 200° C. The polyisobutenyl radical has an average molecular weight of about 850 and the resulting alkenyl succinic anhydride has a saponification number of approximately 101 which corresponds to an average equivalent weight of about 555. Approximately 3,330 parts by weight (6.0 equivalents) of the polyisobutenyl succinic anhydride is added to a 5-liter flask fitted with a stirrer, a thermowell, nitrogen inlet tube, and a Dean-Stark trap at about room temperature. Approximately 408 parts by weight (12 equivalents) of pentaerythritol is mixed with the polyisobutenyl succinic anhydride at about room temperature. This mixture is heated to a temperature of about 200° C. over a period of about 0.85 hour and held at 201°–212° C. for about 3 hours while blowing with nitrogen. Approximately 111 parts by weight (0.21 equivalent) of a polyoxypropylene diamine having an average molecular weight of about 1000 and approximately 56 parts by weight (1.35 equivalents) of a polyamine composition comprising polyethylene polyamine and Polyamine-H (50/50 percent by weight mixture) are combined at room temperature. The amine mixture is added to the polyisobutenyl succinic anhydride and pentaerythritol at a temperature of about 212° C. over a period of about 0.6 hour while blowing with nitrogen. The reaction mixture is held at temperatures ranging from about 211°–212° C., with water being evolved, while blowing with nitrogen. Approximately 2,921 parts by weight of mineral oil is added to the reaction mixture at temperatures ranging from about 131°–212° C. over a period of about ½ hour while blowing with nitrogen. Approximately 5% by weight of a conventional filter aid is added to the reaction product and the product is filtered at temperatures ranging from about 120°–130° C. The product is analyzed and found to have a nitrogen content of about 0.326%.

EXAMPLE 4

A polyisobutenyl succinic anhydride is prepared by reacting a chlorinated polyisobutylene with maleic anhydride at a temperature of about 200° C. The polyisobutenyl radical has an average molecular weight of about 850 and the resulting alkenyl succinic anhydride has a saponification number of approximately 106 which corresponds to an average equivalent weight of about 555. Approximately 1,587 parts by weight (2.86 equivalents) of the polyisobutenyl succinic anhydride is added to a 5-liter flask fitted with a stirrer, a thermowell, nitrogen inlet tube and a Dean-Stark trap at about room temperature. Approximately 194 parts by weight (5.72 equivalents) of pentaerythritol is mixed with the polyisobutenyl succinic anhydride at about room temperature. This reaction mixture is heated to a temperature of about 203° C. over a period of about 1 hour and held at 203°–218° C. for about 3 hours while blowing with nitrogen. Approximately 105 parts by weight (0.20 equivalent) of a polyoxypropylene diamine having an average molecular weight of about 1000 and approximately 22 parts by weight (0.54 equivalent) of a polyamine composition comprising polyethylene polyamine and Polyamine-H (50/50 percent by weight mixture) are combined at room temperature. The amine mixture is added to the reaction mixture of polyisobutenyl succinic anhydride and pentaerythritol at temperatures ranging from about 214°–217° C. over a period of about 0.5 hour while blowing with nitrogen. The reaction mixture is held at temperatures ranging from about 217°–219° C., with water being evolved, while blowing with nitrogen. Approximately 1,400 parts by weight of mineral oil is added to the reaction mixture at temperatures ranging from about 129°–214° C. over a period of about 0.8 hour while blowing with nitrogen. Approximately 5% by weight of a conventional filter aid is added to the reaction product and the product is filtered at temperatures ranging from about 120°–129° C. The product is analyzed and found to have a nitrogen content of about 0.33%.

EXAMPLE 5

A polyisobutenyl succinic anhydride is prepared by reacting a chlorinated polyisobutylene with maleic anhydride at a temperature of about 200° C. The polyisobutenyl radical has an average molecular weight of about 850 and the resulting alkenyl succinic anhydride has a saponification number of approximately 103 which corresponds to an average equivalent weight of about 544. Approximately 3,260 parts by weight (6.0 equivalents) of the polyisobutenyl succinic anhydride is added to a 12-liter flask fitted with a stirrer, thermowell, nitrogen inlet tube and a Dean-Stark trap at about room temperature. Approximately 408 part by weight (12.0 equivalent) of pentaerythritol is mixed with the polyisobutenyl succinic anhydride at about room temperature. This mixture is heated to a temperature of about 190° C. and held at temperatures ranging from 190°–210° C. for a period of about 2.5 hours while blowing with nitrogen. Approximately 110 parts by weight (0.55 equivalent) of a polyoxypropylene diamine having an average molecular weight of about 400 and approximately 19 parts by weight (0.45 equivalent) of a polyamine composition comprising polyethylene polyamine and Polyamine-H (50/50 percent by weight mixture) are combined at room temperature. The amine mixture is added to the reaction mixture of polyisobutenyl succinic anhydride and pentaerythritol at a temperature of about 213° C. over a period of about 0.75 hour while blowing with nitrogen. The reaction mixture is held at temperatures ranging from about 213°–214° C., with water being evolved while blowing with nitrogen. Approximately 3,037 parts by weight of mineral oil is added to the reaction mixture at temperatures ranging from about 131°–205° C. Approximately 5% by weight of a conventional filter aid is added to the reaction product at a temperature of about 120° C. and the product is filtered. The product is analyzed and found to have a nitrogen content of about 0.2%.

EXAMPLE 6

A polyisobutenyl succinic anhydride is prepared by reacting a chlorinated polyisobutylene with maleic anhydride at a temperature of about 200° C. The polyisobutenyl radical has an average molecular weight of about 850 and the resulting alkenyl succinic anhydride has a saponification number of approximately 103 which corresponds to an average equivalent weight of about 544. Approximately 3,260 parts by weight (6.0 equivalents) of the polyisobutenyl succinic anhydride is added to a 12-liter flask fitted with a stirrer, a thermowell, a nitrogen inlet tube, and a Dean-Stark trap at about room temperature. Approximately 408 parts by weight (12.0 equivalents) of pentaerythritol is mixed with the polyisobutenyl succinic anhydride at about room temperature. This mixture is heated to a temperature of 190° C. while blowing with nitrogen and held at temperatures ranging from about 190°–210° C. for a period of auout 2.7 hours. Approximately 110 parts by weight (0.71 equivalent) of a polyoxypropylene triamine having an average molecular weight of about 400 and approximately 12 parts by weight (0.29 equivalent) of a polyamine composition comprising polyethylene polyamine and Polyamine-H (50/50 percent by weight mixture) are combined at room temperature. The amine mixture is added to the reaction mixture of polyisobutenyl succinic anhydride and pentaerythritol at a temperature of about 210° C. over a period of about ½ hour while blowing while nitrogen. This reaction mixture is held at temperatures ranging from about 210°–215° C., with water being evolved, while blowing with nitrogen. Approximately 3,056 parts by weight of mineral oil is added to the reaction mixture at a temperature ranging up to about 215° C. Approximately 5% by weight of a conventional filter aid is added to the reaction product and the product is filtered at a temperature of about 115° C. The product is analyzed and found to have a nitrogen content of about 0.24%.

EXAMPLE 7

A polyisobutenyl succinic anhydride is prepared by reacting a chlorinated polyisobutylene with maleic anhydride at a temperature of about 200° C. The polyisobutenyl radical has an average molecular weight of about 850 and the resulting alkenyl succinic anhydride has a saponification number of about 103 which corresponds to an average equivalent weight of about 544. Approximately 3,260 parts by weight (6.0 equivalents) of the polyisobutenyl succinic anhydride is added to a 12-liter flask fitted with a stirrer, a thermowell, a nitrogen inlet tube and a Dean-Stark trap at about room temperature. Approximately 408 parts by weight (12.0 equivalents) of pentaerythritol and 111 parts by weight (0.94 equivalent) of a polyoxypropylene diamine having an average molecular weight of about 230 is mixed with the polyisobutenyl succinic anhydride at about room temperature. The reaction mixture is heated to temperatures ranging up to about 195° C., while blowing with nitrogen, and then held for a period of about 2.75 hours at temperatures ranging from about 195°–207° C. Approximately 11 parts by weight (0.26 equivalent) of a polyamine composition comprising polyethylene polyamine and Polyamine-H (50/50 percent by weight mixture) are added to the reaction mixture at a temperature of about 207° C. and heated at temperatures ranging from about 207°–210° C. over a period of about one hour. Approximately 3,054 parts by weight of mineral oil is added to the reaction mixture at a temperature of about 120° C. over a period of about ½ hour. Approximately 5% by weight of a conventional filter aid is added to the reaction product and the product is filtered at a temperature of about 120° C. The product is analyzed and found to have a nitrogen content of about 0.25%.

EXAMPLE 8

A polyisobutenyl succinic anhydride is prepared by reacting a chlorinated polyisobutylene with maleic anhydride at a temperature of about 200° C. The polyisobutenyl radical has an average molecular weight of about 850 and the resulting alkenyl succinic anhydride has a saponification number of approximately 103 which corresponds to an average equivalent weight of about 544. Approximately 3,260 parts by weight (6.0 equivalents) of the polyisobutenyl succinic anhydride is added to a 12-liter flask fitted with a stirrer, a thermowell, nitrogen inlet tube and a Dean-Stark trap at about room temperature. Approximately 408 parts by weight (12.0 equivalents) of pentaerythritol is mixed with the polyisobutenyl succinic anhydride at about room temperature. This reaction mixture is heated to a temperature of about 200° C. over a period of about one hour and held at a temperature of about 200°–207° C. for a period of about 2.75 hours while blowing with nitrogen. Approximately 110 parts by weight (0.55 equivalent) of a polyoxypropylene diamine having an average molecular weight of about 400 and approximately 19 parts by weight (0.45 equivalent) of a polyamine composition comprising polyethylene polyamine and Polyamine-H (50/50 percent by weight mixture) are combined at room temperature. The amine mixture is added to the reaction mixture of the polyisobutenyl succinic anhydride and the pentaerythritol at a temperature of about 210° C. while blowing with nitrogen. This reaction mixture is held at temperatures ranging from about 120°–215° C., with water being evolved, while blowing with nitrogen. Approximately 3,037 parts by weight of mineral oil is added to the reaction mixture at temperatures ranging up to about 215° C. Approximately 5% by weight of a conventional filter aid is added to the reaction product and the product is filtered at a temperature of about 110° C. The product is analyzed and found to have a nitrogen content of about 0.22%.

EXAMPLE 9

A polyisobutenyl succinic anhydride is prepared by reacting a chlorinated polyisobutylene with maleic anhydride at a temperature of about 200° C. The polyisobutenyl radical has an average molecular weight of about 850 and the resulting alkenyl succinic anhydride has a saponification number of approximately 103 which corresponds to an average equivalent weight of about 544. Approximately 3,260 parts by weight (6.0 equivalents) of the polyisobutenyl succinic anhydride is added to a 12-liter flask fitted with a stirrer, thermowell, nitrogen inlet tube and a Dean-Stark trap at about room temperature. Approximately 408 parts by weight (12.0 equivalents) of pentaerythritol is mixed with the polyisobutenyl succinic anhydride at about room temperature and heated to 190° C. over a period of about 1 hour and held at a temperature of about 190°–210° C. for a period of about 2.75 hours, while blowing with nitrogen. Approximately 111 parts by weight (0.94 equivalent) of a polyoxypropylene diamine having an average molecular weight of about 230 together with approximately 11 parts by weight (0.26 equivalent) of a polyamine composition comprising polyethylene polyamine and Polyamine-H (50/50 percent by weight mixture) are combined at room temperature. The amine mixture is added to the reaction mixture of polyisobutenyl succinic anhydride and pentaerythritol at a temperature of about 210° C. over a period of about 0.75 hour. The reaction mixture is held at temperatures ranging from about 210°–215° C., with water being evolved, while blowing with nitrogen for a period of about one hour. Approximately 3,054 parts by weight of mineral oil is added to the reaction mixture at a temperature of about 120° C. Approximately 5% by weight of a conventional filter aid is added to the reaction product and the product is filtered. The product is analyzed and found to have a nitrogen content of about 0.25%. The Polyamine-H-utilized comprises an ethylene amine mixture having an average composition corresponding to that of tetraethylene pentamine.

EXAMPLE 10

A polyisobutenyl succinic anhydride is prepared by reacting a chlorinated polyisobutylene with maleic anhydride at a temperature of about 200° C. The polyisobutenyl radical has an average molecular weight of about 850 and the resulting alkenyl succinic anhydride has a saponification number of approximately 103 which corresponds to an average equivalent weight of about 544. Approximately 3,262 parts by weight (6.0 equivalents) of the polyisobutenyl succinic anhydride is added to a 12-liter flask fitted with a stirrer, thermowell, nitrogen inlet tube, and a Dean-Stark trap at about room temperature. Approximately 408 parts by weight (12 equivalents) of pentaerythritol is mixed with the polyisobutenyl succinic anhydride at about 100° C. This mixture is heated to a temperature of about 210° C. over a period of about 4 hours. Approximately 111 parts by weight (0.21 equivalent) of polyoxypropylene diamine having an average molecular weight of about 1000 together with approximately 56 parts by weight (1.35 equivalents) of a polyamine composition comprising polyethylene polyamine and Polyamine-H (50/50 percent by weight mixture) are combined at about room temperature. The amine mixture is added to the reaction mixture of polyisobutenyl succinic anhydride and pentaerythritol at a temperature of about 205° C. The reaction mixture is maintained at a maximum temperature of about 215° C. for about 1.25 hours. Approximately 3,101 parts by weight of mineral oil is added to the reaction mixture and the product is filtered with approximately 5% by weight of a conventional filter aid. The product is analyzed and found to have a nitrogen content of about 0.31%.

EXAMPLE 11

A polyisobutenyl succinic anhydride is prepared by reacting a polyisobutylene with maleic anhydride at a temperature of about 240° C. The polyisobutenyl radical has an average molecular weight of about 850 and a resulting alkenyl succinic anhydride has a saponification number of approximately 70 which corresponds to an average molecular weight of about 800. Approximately 3,262 parts by weight (0.4 equivalent) of the polyisobutenyl succinic anhydride is added to a 12-liter flask fitted with a stirrer, a thermowell, a nitrogen inlet tube and a Dean-Stark trap at about room temperature. Approximately 272 parts by weight (8.0 equivalents) of pentaerythritol is mixed with the polyisobutenyl succinic anhydride at about room temperature. This reaction mixture is heated to a temperature of about 210° C. over a period of about 4 hours. Approximately 74 parts by weight (0.14 equivalent) of a polyoxypropylene diamine having an average molecular weight of about 1000 and approximately 37.4 parts by weight (0.90 equivalent) of a polyamine composition comprising polyethylene polyamine and Polyamine-H (50/50 percent by weight mixture) are combined at room temperature. The amine mixture is added to the reaction mixture of polyisobutenyl succinic anhydride and pentaerythritol at a temperature of about 200° C. over a period of about 1.5 hours. Approximately 3,054 parts by weight of mineral oil is added to the reaction mixture at a temperature ranging from about 210°–215° C. Approximately 5% by weight of a conventional filter aid is added to the reaction product and the product is filtered. The product is analyzed and found to have a nitrogen content of about 0.2%.

EXAMPLE 12

A polyisobutenyl succinic anhydride is prepared by reacting a chlorinated polyisobutylene with maleic anhydried at a temperature of about 200° C. The polyisobutenyl radical has an average molecular weight of about 850 and the resulting alkenyl succinic anhydride has a saponification number of about 103 which corresponds to an average equivalent weight of about 544. Approximately 3,260 parts by weight (6.0 equivalents) of the polyisobutenyl succinic anhydride is added to a 12-liter flask fitted with a stirrer, thermowell, a nitrogen inlet tube and a Dean-Stark trap at about room temperature. Approximately 408 parts by weight (12.0 equivalents) of pentaerythritol is mixed with the polyisobutenyl succinic anhydride at about room temperature and then heated to about 190° C. and held at this temperature for about 2.75 hours while blowing with nitrogen. Approximately 496 parts by weight (0.927 equivalent) of a polyoxypropylene diamine having an average molecular weight of about 1000 is added to the reaction mixture of polyisobutenyl succinic anhydride and pentaerythritol at a temperature of about 205° C. over a period of about 0.5 hour and held at a temperature of about 205°–210° C. for about 1 hour. Approximately 3.372 parts by weight of mineral oil is added to the reaction mixture and the product is filtered at a temperature of about 120° C. The product is analyzed and found to have a nitrogen content of about 0.19%.

EXAMPLE 13

A high molecular weight monocarboxylic acid is prepared by heating 7000 parts by weight of a chlorinated polyisobutene having an average molecular weight of about 400 and a chlorine content of about 11.7% with 1,447 parts by weight of acrylic acid at 80°–120° C. while hydrogen chloride is evolved from the reaction mixture. The reaction mixture is heated to about 210° C. and filtered. The product has a chlorine content of about 0.35% and an acid number of about 114. Approximately 2.85 equivalents of the high molecular weight monocarboxylic acid is added to a 5-liter flask fitted with a stirrer, a thermowell, nitrogen inlet tube and a Dean-Stark trap at about room temperature. Approximately 5.7 equivalents of pentaerythritol is mixed with the high molecular weight monocarboxylic acid. This mixture is heated to a temperature of about 200° C. over a period of about 1 hour and held at 200°–207° C. for about 3 hours while blowing with nitrogen. Approximately 0.05 equivalent of polyoxypropylene diamine having an average molecular weight of about 2000 and approximately 0.69 equivalent of a polyamine composition comprising polyethylene diamine and Polyamine-H (50/50 percent by weight mixture) are combined at about room temperature. The amine mixture is added to the monocarboxylic acid and pentaterythritol at a temperature of about 107° C. over a period of about ½ hour while blowing with nitrogen. The reaction mixture is held at temperatures ranging from about 205°–207° C. while blowing with nitrogen. Approximately 1,429 parts by weight of mineral oil is added to the reaction mixture at temperatures ranging from about 131°–205° C. over a period of about ½ hour. Approximately 5% by weight of a conventional filter aid is added to the reaction product and the product is filtered at temperatures ranging from about 115°–130° C.

EXAMPLE 14

A chlorinated polyisobutene having an average molecular weight of about 1000 and a chlorine content of 4.5% (6300 parts by weight, 8 equivalents of chlorine) is mixed with acrylic acid (940 parts by weight, 13 equivalents) and the mixture is heated to 230° C. while hydrogen chloride is evolved. The product is heated to 130°–182° C. and filtered. The product has an acid number of 63 and a chlorine content of 0.62%. Approximately 2.85 equivalents of the high molecular weight monocarboxylic acid is added to a 5-liter flask fitted with a stirrer, a thermowell, nitrogen inlet tube and a Dean-Stark trap at about room temperature. Approximately 5.7 equivalents of an alkylene glycol is mixed with the monocarboxylic acid at about room temperature and heated to a temperature of about 200° C. over a period of about 1 hour and then held at 200°–207° C. for about 3 hours while blowing with nitrogen. Approximately 0.05 equivalent of a polyoxyethylene diamine having an average molecular weight of about 1000 and approximately 0.69 equivalent of a polyamine composition comprising polyethylene polyamine and Polyamine-H (50/50 percent by weight mixture) are combined at room temperature. The amine mixture is added to the acrylic acid and the glycol at a temperature of about 207° C. over a period of about ½ hour while blowing with nitrogen. The reaction mixture is held at temperatures ranging from about 205°–207° C. while blowing with nitrogen. Approximately 1500 parts by weight of mineral oil is added to the reaction mixture at temperatures ranging from about 131°–205° C. over a period of about ½ hour. Approximately 5% by weight of a conventional filter aid is added to the reaction product and the product is filtered at temperatures ranging from about 115°–130° C.

EXAMPLE 15

A chlorinated polyisobutene having an average molecular weight of about 1000 and a chlorine content of about 4.5% is mixed with acrylic acid and heated to about 230° C. while hydrogen chloride is evolved. The reaction product is heated to about 130°–182° C. and filtered. The product has an acid number of 53 and a chlorine content of 0.62%. Approximately 6.0 equivalents of the high molecular weight monocarboxylic acid is added to a 12-liter flask fitted with a stirrer, thermowell, nitrogen inlet tube and a Dean-Stark trap at about room temperature. Approximately 12 equivalents of pentaerythritol is added to the high molecular weight monocarboxylic acid at about room temperature and then heated to about 190° C. and held at this temperature for about 2.75 hours while blowing with nitrogen. Approximately 0.927 equivalent of polyoxypropylene diamine having an average molecular weight of about 1000 is added to the mixture of the high molecular weight monocarboxylic acid and pentaerythritol at a temperature of about 205° C. over a period of about 0.5 hour and then held at temperatures of about 205°–210° C. for about 1 hour. Approximately 3,372 parts by weight of mineral oil is added to the reaction product and the product is filtered at a temperature of about 120° C.

EXAMPLE 16

A high molecular weight tricarboxylic acid is prepared by reacting a brominated poly(1-hexane) having a molecular weight of about 2000 and a bromine content of about 4% by weight with 2-pentene-1,3,5-tricarboxylic acid (prepared by dehydration of citric acid). Approximately 2.85 equivalents of the high molecular weight tricarboxylic acid is added to a 5-liter flask fitted with a stirrer, thermowell, nitrogen inlet tube and a Dean-Stark trap at about room temperature. Approximately 5.7 equivalents of pentaerythritol is added to the tricarboxylic acid at about room temperature. This mixture is heated to a temperature of about 200° C. over a period of about 1 hour and held at 200°–207° C. for about 3 hours while blowing with nitrogen. Approximately 0.05 equivalent of a polyoxypropylene diamine having an average molecular weight of about 2000 and approximately 0.69 equivalent of a polyamine composition comprising polyethylene polyamine and Polyamine-H (50/50 percent by weight mixture) are combined at room temperature. This amine mixture is then added to the mixture of the tricarboxylic acid and the pentaerythritol at a temperature of about 207° C. over a period of about ½ hour while blowing with nitrogen. The reaction mixture is held at temperatures ranging from about 205°–207° C. while blowing with nitrogen. Approximately 1,429 parts by weight of mineral oil is added to the reaction mixture at temperatures ranging from about 131°–205° C. over a period of about ½ hour. Approximately 5% by weight of a conventional filter aid is added to the reaction product and the product is filtered at temperatures ranging from about 115°–130° C.

EXAMPLE 17

A high molecular weight tricarboxylic acid is prepared by reacting a brominated poly(1-hexene) having a molecular weight of about 2000 and a bromine content of 4% by weight with 2-pentene-1,3,5-tricarboxylic acid. Approximately 6.0 equivalents of the high molecular weight tricarboxylic acid is added to a 12-liter flask fitted with a stirrer, a thermowell, nitrogen inlet tube and a Dean-Stark trap at about room temperature. Approximately 12 equivalents of pentaerythritol is mixed with the high molecular weight tricarboxylic acid at about room temperature and then heated to about 190° C. and held at this temperature for about 2.75 hours while blowing with nitrogen. Approximately 0.927 equivalent of a polyoxyalkylene diamine having an average molecular weight of about 1000 is added to the mixture of the tricarboxylic acid and pentaerythritol at a temperature of about 205° C. over a period of about 0.5 hour and held at about 205°–210° C. for about 1 hour. Approximately 3,372 parts by weight of mineral oil is added to the mixture and the product is filtered at a temperature of about 120° C.

EXAMPLE 18

A chlorinated polyisobutene having a molecular weight of 1000 and a chlorine content of 4.3% and propyl alpha-chloroacrylate are heated to 170°–220° C. for 17 hours and then at 180° C. Approximately 6.0 equivalents of the high molecular weight acrylic acid-producing compound is added to a 12-liter flask with about 12 equivalents of pentaerythritol at about room temperature and subsequently heated to about 190° C. and held at this temperature for about 3 hours while blowing with nitrogen. Approximately 0.927 equivalent of polyoxypropylene diamine having an average molecular weight of about 2000 is added to the mixture at a temperature of about 205° C. over a period of about ½ hour and held at about 205°–210° C. for about 1 hour. Approximately 3,372 parts by weight of mineral oil is added to the reaction mixture and the product is filtered at a temperature of about 120° C.

The dispersants of this invention which have improved demulsifying characteristics may be used as an additive for a variety of oleaginous materials including, for example, the synthetic and mineral oil lubricants, normally liquid fuels, e.g., gasoline, diesel fuels, etc., in amounts ranging from about 0.001 to about 25% by weight of the compositions. Preferably, however, the dispersant may be used in amounts ranging from about 0.01 to 15% and more preferably in amounts ranging from about 0.1 to 10% by weight of the total composition. The optimum amount added to the oleaginous materials will depend upon the particular type of surface and the conditions to which the fuel or lubricant is to be subjected. For example, if the dispersant is to be used in gasoline for an internal combustion engine amounts ranging from about 0.001 to about 1.0% by weight of the dispersant may be sufficient; whereas if the dispersant is to be added to a gear lube or used in a diesel engine the amount may range as high as 25% or higher by weight of the total composition. In some instances, even larger percentages, e.g., up to about 30% by weight, of the dispersant may be utilized depending upon the particular use of the composition. Typical examples of utilizing the dispersants of this invention are illustrated by the following.

Example A

A lubricating composition is prepared by blending SAE 10W–30 mineral lubricating oil with approximately 10% by weight of a viscosity-index improver and approximately 6.7% by weight of a dispersant composition. The dispersant composition comprises (1) approximately 60% by weight of a product obtained by reacting polyisobutenyl succinic anhydride with pentaerythritol, polyalkylene polyamines and polyoxyalkylene glycols (2) approximately 13% by weight of zinc dialkyl phosphorodithioate (3) approximately 21% by weight of calcium sulfonate and (4) approximately 6% by weight of mineral lubricating oil.

Example B

A lubricating composition is prepared by blending SAE 10W–30 mineral lubricating oil with approximately 10% by weight of a viscosity-index improver and the dispersant described in Example A. The dispersant composition of Example A is modified, however, by replacing (1) the polyisobutenyl succinic anhydride reaction product of the composition with the product obtained from Example 4 of this invention.

The demulsifying characteristics of the dispersant of this invention are illustrated by the data presented in Table I.

TABLE I.—EMULSION TEST

| Lubricating compositions | Days | | | | | | |
| --- | --- | --- | --- | --- | --- | --- | --- |
| | 1 | 2 | 3 | 4 | 5 | 6 | 7 |
| Example A | 6.5 | 7.0 | 7.0 | 7.0 | 6.5 | 4.5 | |
| Example B | 7.0 | 7.5 | 7.0 | 7.0 | 7.0 | 6.5 | 6.5 |

The demulsifying characteristics of the dispersants of this invention are illustrated by the Falcon Engine Test results presented in the table. This test utilizes a Ford Falcon 6-cylinder engine operating on a cycling procedure consisting of 45 minutes at idle 500 r.p.m., no load, followed by 120 minutes at 2500 r.p.m., 31 BHP. The engine is modified by providing for water cooling of the rocker-arm cover in order to maintain a cover temperature of about 105°–115° F. During the cycle, the blow-by is passed through a condenser and the condensate is returned to the crankcase. The cycle is repeated 5 times in succession each day (for 13¾ hours of the engine operation) and then the engine is shut down for the remainder of the day (for 10¼ hours). The test is run on a consecutive day-to-day basis. The daily test evaluation consists of rating the rocker-arm cover for emulsion deposits on a numerical scale of 1 to 10, where 10 represents maximum cleanliness, i.e., freedom from aqueous emulsion deposits. The rocker-arm cover is removed and inspected after each 13¾ hours of operation and the cover then immediately replaced.

In addition to the dispersant compositions of this invention, it is obvious that other known additives may be used in the fuel or lubricant. These additives include, for example, detergents of the ash-containing type, dispersants of the ashless-type, viscosity index improving agents, pour-point depressing agents, anti-foam agents, extreme pressure agents, rust-inhibiting agents, oxidation and corrosion inhibiting agents, and various mixtures of these materials in various proportions. More particularly the ash-containing detergents may be illustrated by the presently available oil soluble neutral and basic salts of the alkali or alkaline earth metals of the sulfonic acids, carboxylic acids, or the organic phosphorus acids. These materials may be prepared, for example, by the reaction of an olefin polymer, e.g., polyisobutene, having a molecular weight of about 2000 with a phosphorizing agent including, for example, phosphorus trichloride, phosphorus heptasulfide, phosphorus pentasulfide, phosphorus trichloride and sulfur, white phosphorus, and a sulfur halide or phosphorothioic chloride. The most commonly used salts of these acids, however, are the salts of sodium, potassium, lithium, calcium, magnesium, strontium, barium and various mixtures thereof.

The term "basic salt" as used herein is intended to include the metal salts where the metal is present in stoichiometrically larger amounts than the organic acid radical. The commonly employed methods for preparing the basic salts comprises heating a mineral oil solution of the acid with a stoichiometric excess of a metal neutralizing agent, e.g., a metal oxide, hydroxide, carbonate, bicarbonate, sulfide, etc., at temperatures above about 50° C. In addition, various promoters may be used in the neutralizing process to aid in the incorporation of the large excess of metal. These promoters are presently known and include such compounds as the phenolic substances, e.g., phenol, naphthol, alkylphenol, thiophenol, sulfurized alkylphenol and the various condensation products of formaldehyde with a phenolic substance, e.g., alcohols such as methanol, 2-propanol, octyl alcohol, Cellosolve, Carbitol, ethylene, glycol, stearyl alcohol, and cyclohexyl alcohol; amines such as aniline, phenylenediamine, phenothiazine, phenyl-beta-naphthylamine, and dodecyl amine, etc. A particularly effective process for preparing the basic salts comprises mixing the acid with an excess of the basic alkaline earth metal in the presence of the phenolic promoter and a small amount of water and carbonating the mixture at an elevated temperature, e.g., 60° C. to about 200° C.

Extreme pressure agents, corrosion-inhibiting and oxidation-inhibiting agents are exemplified by chlorinated aliphatic hydrocarbons such as chlorinated wax; organic sulfides and polysulfides such as benzyl disulfide, bis(chlorobenzyl) disulfide, dibutyl tetrasulfide, sulfurized sperm oil, sulfurized methyl ester of oleic acid, sulfurized alkylphenol, sulfurized dipentene, and sulfurized terpene, phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl substituted phenyl phosphite; metal thiocarbamates such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and zinc salt of a phosphorodithioic acid produced by the reaction of phosphorus pentasulfide with an equimolar mixture of isopropyl alcohol and n-hexyl alcohol.

The fuel or lubricating compositions may contain also metal detergent additives in amounts usually within the range of about 0.001% to about 15% by weight. In some applications, e.g., in lubricating marine diesel engines, the lubricating compositions may contain as much as 30% of a detergent additive. The compositions, e.g., lubricants or fuels, etc., may contain also extreme pressure agents, viscosity index improving agents, pour point depressing agents, etc., each in amounts within the range of from about 0.001 to 15% and preferably in amounts of 0.1% to about 10%. One or more of the above-mentioned additives may be used either alone or in combination in compositions, e.g., fuels or lubricating oils, etc., with about 0.001% to 25% by weight of the dispersants of this invention.

The lubricants, i.e., the oleginous materials include the animal oils and vegetable oils, e.g., castor oil, lard oil, etc., as well as solvent-refined or acid-refined mineral lubricating oils of the paraffinic, naphthenic, or mixed paraffinic-naphthenic types. Oils of lubricating viscosity derived from coal or shale are also useful base oils. The synthetic lubricating oils include the hydrocarbon oils and halo-substituted hydrocarbon oils such as polymerized and interpolymerized olefins (e.g., polybutylenes, propylene-isobutylene copolymers, chlorinated polybutylenes, etc.); alkyl benzenes (e.g., dodecylbenzene, tetradecylbenzene, dinonylbenzene, di-(2-ethylhexyl)benzene, etc.); polyphenyls (e.g., bi-phenyls, terphenyls, etc.) and the like. The alkylene oxide polymers and interpolymers and derivatives thereof where the terminal hydroxyl groups have been modified by esterification, etherification, etc., comprise another class of known synthetic lubricating oils. These are exemplified by the oils prepared by polymerization of ethylene oxide, propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500 to 1000, diethyl ether of polypropylene glycol having a molecular weight of 1000 to 1500, etc.) or mono- and polycarboxylic esters thereof, for example, the acetic acid esters, mixed $C_3$–$C_8$ fatty acid esters, or the $C_{13}$Oxo acid diester of tetraethylene glycol.

Another class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alchohol, dodecyl alcohol, 2-ethylhexyl alcohol, pentaerythritol, etc.). Specific examples of these esters include dibutyl adipate, di(2-ethylhexyl)-sebacate, di-n-hexyl fumarate, dioctyl sebacate, diisoctyl azelate, diisodocyl azelate, dioctyl phthalate, didecyl phthalate, dieicoxyl sebacate, the 2-ethylhexyl diester of linoleic acid dimer, the complex ester formed by reacting one mole of sebacic acid with two moles of 2-ethyl-hexanoic acid, and the like.

Silicone-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra-(2-ethylhexyl)-silicate, tetra-(4-methyl-2-tetraethyl)silicate, tetra-(p-tert-butylphenyl)-silicate, hexyl-(4-methyl-2-pentoxy)-disiloxane, poly(methyl)-siloxanes, poly(methylphenyl)-siloxanes, etc.). Other synthetic lubricants include the liquid esters of phosphorus-containing acids (e.g., tricresyl phosphate, trioctyl phosphate, diethyl ester of decane phosphonic acid, etc.), polymeric tetrahydrofurans, and the like.

While this invention is described with a number of specific embodiments, it is obvious that there are other variations and modifications which can be made without departing from the spirit and scope of the invention as particularly set forth in the appended claims.

What is claimed is:

1. A lubricant or fuel composition comprising a major amount of a lubricating oil or a normally liquid fuel and from about 0.001% to about 25% by weight of an additive, said additive comprising the reaction product obtained by the reaction, at a reaction temperature in the range of 25° C. to 300° C., of a substituted dicarboxylic acid acylating agent (A) in which the substituents are derived from 1-olefin polymers or halogenated 1-olefin polymers, having an average molecular weight in the range of about 700 to 5000, with
   (I) a polyhydric aliphatic alcohol (B) having from 2 to 10 hydroxy groups per molecule;
   (II) a polyoxyalkylene polyamine (C) having a molecular weight in the range of from about 200 to about 4000, and selected from the group consisting of those corresponding to formulas
   $H_2N$—Alkylene—(—O—Alkylene)$_m$—$NH_2$,
   and
   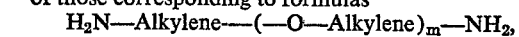
   wherein $m$ has a value of about 3 to about 70, $n$ has a value of from about 1 to about 40 with the proviso that the sum of all the $n$'s is from about 3 to about 70, and R is a polyvalent saturated hydrocarbon radical of up to about 10 carbon atoms and has a valence of 3 to 6; and
   (III) an alkylene amine (D);
   wherein both (B) and (D) are present in amounts ranging from about 0.01 to about 4 equivalents per equivalent of (A), and (C) is present in an amount ranging from about 0.01 to about 2.0 equivalents per equivalent of (A).

2. The lubricating composition of claim 1, wherein the additive is present in an amount ranging from about 0.01% to 15% by weight.

3. The fuel composition of claim 1, wherein the additive is present in an amount ranging from 0.001% to 1.0% by weight.

4. A lubricant or fuel composition comprising a major amount of a lubricating oil or normally liquid fuel and from about 0.001% to 25% by weight of an additive, said additive comprising the reaction product obtained by the reaction, at a reaction temperature in the range of 25° to 250° C., of a substituted succinic acylating agent (A) wherein the substituents are derived from the group consisting of ethylene-propylene copolymer, polypropylene, polyisobutylene, halogenated ethylenepropylene copolymer, halogenated polypropylene and chlorinated polyisobutylene, with
   (I) pentaerythritol (B),
   (II) a polyoxyalkylene polyamine (C) selected from the group consisting of those corresponding to formulas
   $H_2N$—Alkylene—(—O—Alkylene)$_m$—$NH_2$,
   and
   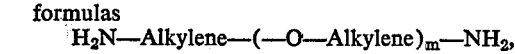
   wherein $m$ has a value of about 10 to about 35, $n$ has a value of from about 1 to about 40, with the proviso that the sum of all of the $n$'s is from about 6 to about 35, and R is a polyvalent saturated hydrocarbon radical of up to about 10 carbon atoms and has a valence of from 3 to 6; and
   (III) an alkylene amine corresponding to the formula
   H—N(R)—[—Alkylene—N(R)—]$_n$—H, wherein $n$ is an integer having a value of up to 10, and R is a substantially hydrocarbon or hydrogen radical; wherein both (B) and (D) are present in amounts ranging from about 0.01 to about 4 equivalents per equivalent of (A), and (C) is present in an amount ranging from about 0.01 to about 2.0 equivalent per equivalent of (A).

5. The lubricant or fuel composition of claim 4, wherein the polyoxyalkylene polyamine (C) corresponds to the formula H₂N—Alkylene—(—O—Alkylene)ₘ—NH₂.

6. The lubricant or fuel composition of claim 4, wherein the polyoxyalkylene polyamine (C) corresponds to the formula R—[—Alkylene—(—O—Alkylene—)ₙ—NH₂]₃₋₆

7. The lubricating composition of claim 4, wherein the additive is present in an amount ranging from about 0.01% to 15% by weight.

8. The fuel composition of claim 4, wherein the additive is present in an amount ranging from about 0.001% to 1.0% by weight.

9. A lubricant or fuel composition comprising a major amount of a lubricating oil or a normally liquid fuel and a minor amount of additive sufficient to improve the demulsifying characteristics of the composition, said additive comprising the reaction product obtained by the reaction of a carboxylic acid acylating agent (A) having at least 30 aliphatic carbon atoms per molecule, with (I) a hydroxy compound (B) selected from the group consisting of at least one polyhydric aliphatic alcohol or aromatic alcohol;

(II) a polyoxyalkylene polyamine (C) having an average molecular weight of at least about 200 and selected from the group consisting of those corresponding to the formulas, H₂N—Alkylene—(—O—Alkylene)ₘ—NH₂, and R—[—Alkylene—(—O—Alkylene)ₙ—NH₂]₃₋₆, wherein m has a value of about 3 to about 70, n has a value of from about 1 to about 40 with the proviso that the sum of all the n's is from about 3 to about 70, and R is a polyvalent saturated hydrocarbon radical of up to about 10 carbon atoms and has a valence of 3 to 6; and (III) an alkylene amine (D);

wherein both (B) and (C) are present in amounts of at least about 0.001 equivalent per equivalent of (A), and (D) is present in an amount ranging from zero to about 4 equivalents per equivalent of (A).

10. The lubricant or fuel composition of claim 9, wherein the acylating agent (A) is a substituted succinic acid or anhydride having substituents derived from the group consisting of ethylene-propylene copolymer, polypropylene, polyisobutylene, halogenated ethylene-propylene copolymer, halogenated polypropylene and chlorinated polyisobutylene.

11. The lubricant or fuel composition of claim 9 wherein the acylating agent (A) is a substituted dicarboxylic acid in which the substituents are derived from 1-olefin polymers or halogenated 1-olefin polymers and have an average molecular weight in the range of about 700 to about 5000; the hydroxy compound (B) is a polyhydric aliphatic alcohol having from 2 to 10 hydroxy groups per molecule; the polyoxyalkylene polyamine (C) is a diamine or triamine, having a molecular weight in the range of from about 200 to about 4000; (B) is present in an amount ranging from about 0.01 to 4.0 equivalents per equivalent of (A); (C) is present in an amount from about 0.01 to about 2.0 equivalents per equivalent of (A), and (D) is present in an amount of at least about 0.001 equivalent per equivalent of (A).

12. The lubricant or fuel composition of claim 9, wherein the polyoxyalkylene polyamine (C) is a member selected from the group consisting of those corresponding to formulas, H₂N—Alkylene—(—O—Alkylene)ₘ—NH₂, and R—[—Alkylene—(—O—Alkylene)ₙ—NH₂]₃₋₆, wherein m has a value of about 10 to about 35, n has a value of from about 1 to about 40 with the proviso that the sum of all the n's is from about 6 to about 35, and R is a polyvalent saturated hydrocarbon radical of up to about 10 carbon atoms and has a valence of 3 to 6.

13. The lubricant of fuel composition of claim 12, wherein the polyoxyalkylene polyamine (C) corresponds to the formula H₂N—Alkylene—(—O—Alkylene)ₘ—NH₂.

14. The lubricant or fuel composition of claim 12, wherein the polyoxyalkylene polyamine (C) corresponds to the formula R—[—Alkylene—(—O—Alkylene—)ₙ—NH₂]₃₋₆

15. The lubricant or fuel composition of claim 9 wherein the hydroxy compound (B) is a polyhydric aliphatic alcohol having from 2 to 10 hydroxy groups per molecule.

References Cited
UNITED STATES PATENTS

| | | | |
|---|---|---|---|
| 3,251,664 | 5/1966 | Dickson et al. | 44—71 X |
| 3,620,977 | 11/1971 | Honnen et al. | 252—51.5 A |
| 3,630,904 | 12/1971 | Musser et al. | 252—51.5 A |

DANIEL E. WYMAN, Primary Examiner

W. J. SHINE, Assistant Examiner

U.S. Cl. X.R.

44—63, 66, 71; 252—77

UNITED STATES PATENT OFFICE
CERTIFICATE OF CORRECTION

Patent No. 3,804,763            Dated April 16, 1974

Inventor(s) Norman Anthony Meinhardt

It is certified that error appears in the above-identified patent and that said Letters Patent are hereby corrected as shown below:

Claim 4, line 18, second formula change
"R-[Alkylene..." to --R-[-Alkylene...--.

Claim 4, line 32 change "equivalent" to
--equivalents--.

Column 1, before abstract of disclosure change
"Serial No. 150,017" to --Serial No. 159,017--.

Signed and sealed this 17th day of September 1974.

(SEAL)
Attest:

McCOY M. GIBSON JR.                C. MARSHALL DANN
Attesting Officer                  Commissioner of Patents